United States Patent
Frankfurth

(10) Patent No.: US 11,274,938 B2
(45) Date of Patent: Mar. 15, 2022

(54) ACCELERATION SENSOR CORRECTION FOR SENSORS MOUNTED ON INFRASTRUCTURE

(71) Applicant: Continental Automotive Systems, Inc., Auburn Hills, MI (US)

(72) Inventor: Joshua David Frankfurth, San Jose, CA (US)

(73) Assignee: Continental Automotive Systems, Inc., Auburn Hills, MI (US)

( * ) Notice: Subject to any disclaimer, the term of this patent is extended or adjusted under 35 U.S.C. 154(b) by 199 days.

(21) Appl. No.: 16/594,415

(22) Filed: Oct. 7, 2019

(65) Prior Publication Data

US 2020/0209014 A1 Jul. 2, 2020

Related U.S. Application Data

(60) Provisional application No. 62/785,330, filed on Dec. 27, 2018.

(51) Int. Cl.
| | |
|---|---|
| G01C 25/00 | (2006.01) |
| G01C 21/28 | (2006.01) |
| G08G 1/01 | (2006.01) |
| G08G 1/048 | (2006.01) |

(52) U.S. Cl.
CPC ............. G01C 25/00 (2013.01); G01C 21/28 (2013.01); G08G 1/0116 (2013.01); G08G 1/048 (2013.01)

(58) Field of Classification Search
USPC .......................................... 702/94
See application file for complete search history.

(56) References Cited

U.S. PATENT DOCUMENTS

| | | | |
|---|---|---|---|
| 2010/0141761 A1* | 6/2010 | McCormack | H04N 5/23248 348/143 |
| 2011/0091131 A1* | 4/2011 | Price | G06T 3/0018 382/294 |
| 2020/0053286 A1* | 2/2020 | Corona | H04N 5/23267 |

* cited by examiner

*Primary Examiner* — Paul D Lee

(57) ABSTRACT

A method and apparatus includes at least one first sensor configured to be mounted to an infrastructure component, wherein the at least one sensor comprises an environmental sensor. At least one second sensor is configured to be mounted to the infrastructure component, and is configured to sense movement of the infrastructure component. The method and apparatus also includes a system that uses the at least one first sensor to detect an object position and determines an amount of correction for the object position based on movement detected by the at least one second sensor.

14 Claims, 2 Drawing Sheets

ACCELERATION SENSOR CORRECTION FOR SENSORS MOUNTED ON INFRASTRUCTURE

PRIORITY CLAIM

This application claims the benefit of U.S. Provisional Application No. 62/785,330 filed on Dec. 27, 2018.

TECHNICAL FIELD

The subject invention is directed to a method and system that uses a first sensor on an infrastructure component to detect a moving object position and determines an amount of correction for the moving object position based on movement of the infrastructure component detected by a second sensor.

BACKGROUND

Environmental sensor systems provide data to autonomous vehicles such that the vehicles can follow lanes, avoid collisions, re-route around traffic, etc. These systems can also communicate data to driver-operated vehicles to provide updates regarding weather, traffic, road conditions, emergency warnings, etc. The sensor systems include various types of sensors that are mounted to infrastructure (traffic lights, signs, parking meters, etc.) near intersections, along roads, and on buildings. The sensor systems are used to recognize lane and crosswalk boundaries, and can also be used to determine distances between vehicles and/or other objects that are stationary or moving in or along the road.

This data is compiled and broadcasted such that the information can be communicated to various entities. One example of a communication system is referred to as "vehicle-to-everything (V2X)" communication, and includes the passing of information from a vehicle to any entity that may affect the vehicle, and vice versa. It is a vehicular communication system that incorporates other more specific types of communication such as V2I (vehicle-to-infrastructure), V2N (vehicle-to-network), V2V (vehicle-to-vehicle), V2P (vehicle-to-pedestrian), V2D (vehicle-to-device), and V2G (vehicle-to-grid). This type of communication improves road safety and traffic efficiency, as well as providing energy savings. Thus, it is important that the sensors provide accurate data.

SUMMARY

In one exemplary embodiment, an apparatus includes at least one first sensor configured to be mounted to an infrastructure component, wherein the at least one sensor comprises an environmental sensor. At least one second sensor is configured to be mounted to the infrastructure component, wherein the at least one second sensor is configured to sense movement of the infrastructure component. The method and apparatus also includes a system that uses the at least one first sensor to detect an object position and determines an amount of correction for the object position based on movement detected by the at least one second sensor.

In another embodiment according to the previous embodiment, the at least one second sensor comprises an accelerometer.

In another embodiment according to any of the previous embodiments, the infrastructure component comprises a pole or other structure that is capable of moving relative to ground.

In another embodiment according to any of the previous embodiments, the at least one first sensor comprises a motion sensor, a radar sensor, an optical camera sensor, a lidar sensor, a laser sensor and/or an ultrasonic sensor.

In another embodiment according to any of the previous embodiments, the at least one first sensor detects object position of a moving object relative to a stationary object. The at least one second sensor detects movement of the infrastructure component to correct object position as detected by the at least one first sensor, and the at least one second sensor comprises an accelerometer.

In another embodiment according to any of the previous embodiments, the moving object comprises one or more of a vehicle, pedestrian, and/or biker, and wherein the stationary object comprises one or more of a crosswalk, sidewalk, and/or a lane, and wherein the infrastructure component comprises a sign, pole, building, street light, and/or traffic light that is capable of moving relative to ground.

In another embodiment according to any of the previous embodiments, movement of the infrastructure component relative to ground is initiated by a wind force.

In another embodiment according to any of the previous embodiments, the system includes a controller configured to receive data from the at least one first sensor and the at least one second sensor, determine current moving object positions based on the data from the at least one first sensor, determine an amount of movement of the infrastructure component based on the data from the at least one second sensor, and subsequently correct the current moving object positions during the movement to compensate for movement of the infrastructure component.

In another embodiment according to any of the previous embodiments, movement of the infrastructure component relative to ground is initiated by an external force exerted on the infrastructure component.

In another embodiment according to any of the previous embodiments, the external force comprises a wind force.

In another embodiment according to any of the previous embodiments, the system includes a controller configured to receive data from the at least one first sensor and the at least one second sensor, determine current moving object positions based on the data from the at least one first sensor, determine an amount of movement of the infrastructure component based on the data from the at least one second sensor, and subsequently correct the current moving object positions during the movement to compensate for movement of the infrastructure component.

In another embodiment according to any of the previous embodiments, corrected moving object positions are broadcast via a communication system that receives object position information from the controller.

In another embodiment according to any of the previous embodiments, the communication system comprises a vehicle-to-everything communication and includes one or more of the following interfaces: vehicle-to-infrastructure, vehicle-to-network, vehicle-to-vehicle, vehicle-to-pedestrian, vehicle-to-device, and/or vehicle-to-grid.

In another exemplary embodiment, a method includes mounting at least one first sensor to an infrastructure component, wherein the at least one sensor comprises an environmental sensor; mounting at least one second sensor to the infrastructure component, wherein the at least one second sensor is configured to sense movement of the infrastructure component; using the at least one first sensor to detect an object position, and determining an amount of correction for the object position based on movement detected by the at least one second sensor.

In another embodiment according to any of the previous embodiments, the at least one first sensor detects object position of a moving object relative to a stationary object. The at least one second sensor detects movement of the infrastructure component to correct object position as detected by the at least one first sensor. The moving object comprises one or more of a vehicle, pedestrian, and/or biker. The stationary object comprises one or more of a crosswalk, sidewalk, and/or a lane. The infrastructure component comprises a sign, pole, building, street light, traffic light, or other structure that is capable of moving relative to ground.

In another embodiment according to any of the previous embodiments, a controller receives data from the at least one first sensor and the at least one second sensor, determines current moving object positions based on the data from the at least one first sensor, determines an amount of movement of the infrastructure component based on the data from the at least one second sensor, and subsequently corrects the current moving object positions during the movement to compensate for movement of the infrastructure component.

In another embodiment according to any of the previous embodiments, the method includes broadcasting corrected moving object positions via a communication system that receives object position information from the controller.

In another embodiment according to any of the previous embodiments, the communication system comprises a vehicle-to-everything communication and includes one or more of the following interfaces: vehicle-to-infrastructure, vehicle-to-network, vehicle-to-vehicle, vehicle-to-pedestrian, vehicle-to-device, and/or vehicle-to-grid.

In another embodiment according to any of the previous embodiments, movement of the infrastructure component relative to ground is initiated by an external force exerted on the infrastructure component.

In another embodiment according to any of the previous embodiments, the external force comprises a wind force.

BRIEF DESCRIPTION OF THE DRAWINGS

The disclosure can be further understood by reference to the following detailed description when considered in connection with the accompanying drawings wherein.

The embodiments, examples and alternatives of the preceding paragraphs, the claims, or the following description and drawings, including any of their various aspects or respective individual features, may be taken independently or in any combination. Features described in connection with one embodiment are applicable to all embodiments, unless such features are incompatible.

DETAILED DESCRIPTION OF AN EMBODIMENT

The subject invention provides an apparatus that includes at least one first sensor configured to be mounted to an infrastructure component, wherein the at least one sensor comprises an environmental sensor, and at least one second sensor configured to be mounted to the infrastructure component, wherein the at least one second sensor is configured to sense movement of the infrastructure component. A system uses the at least one first sensor to detect an object position and determines an amount of correction for the object position based on movement detected by the at least one second sensor.

In one example, the environmental sensor tracks and detects objects to determine an object position. In one example, the infrastructure component comprises a pole or other structure that is capable of moving relative to ground. In one example, the at least one second sensor comprises an acceleration sensor. The system uses the acceleration sensor to correct deviations in detected object position when sensors are mounted on infrastructure that is expected to be stationary, but could be moving or oscillating due to environmental impacts such as wind.

Figure 1:
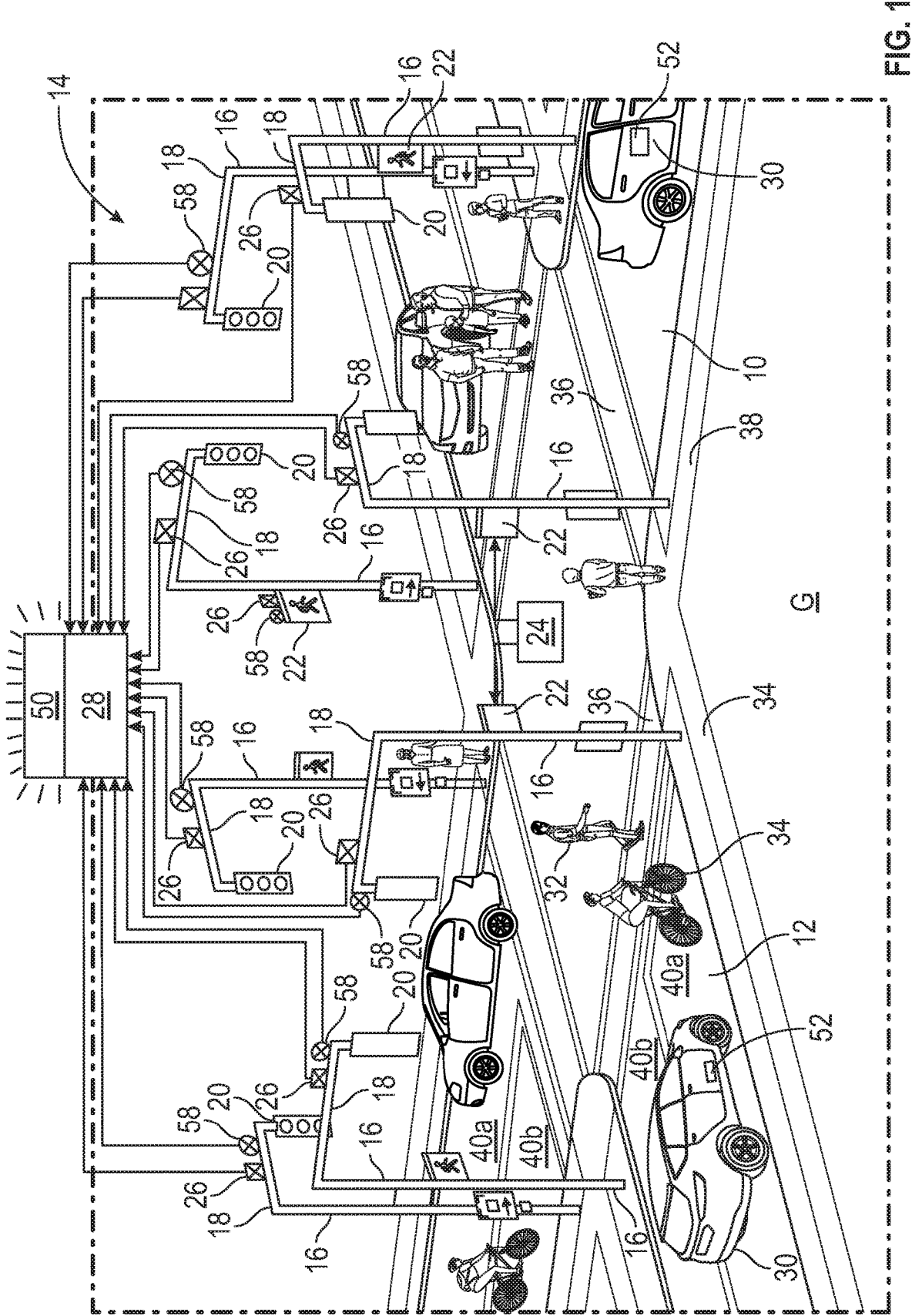
FIG. 1 is a perspective view of an intersection incorporating a system according to the invention.

FIG. 1 shows an intersection of a first road 10 with a second road 12. A traffic light system 14 is positioned at one or more corners between the first 10 and second 12 roads. In one example, the traffic light system 14 includes one or more main poles 16 that are held fixed relative to ground G. In one example, the main poles 16 extend upwardly from the ground G and support one or more secondary poles or traffic arms 18. Each traffic arm 18 includes one or more traffic lights 20. The main pole 16 may also include additional traffic lights or signs 22. A traffic light controller 24 controls operation of the traffic lights 20 such that vehicles can move efficiently through the intersection without colliding with each other.

Figure 2:
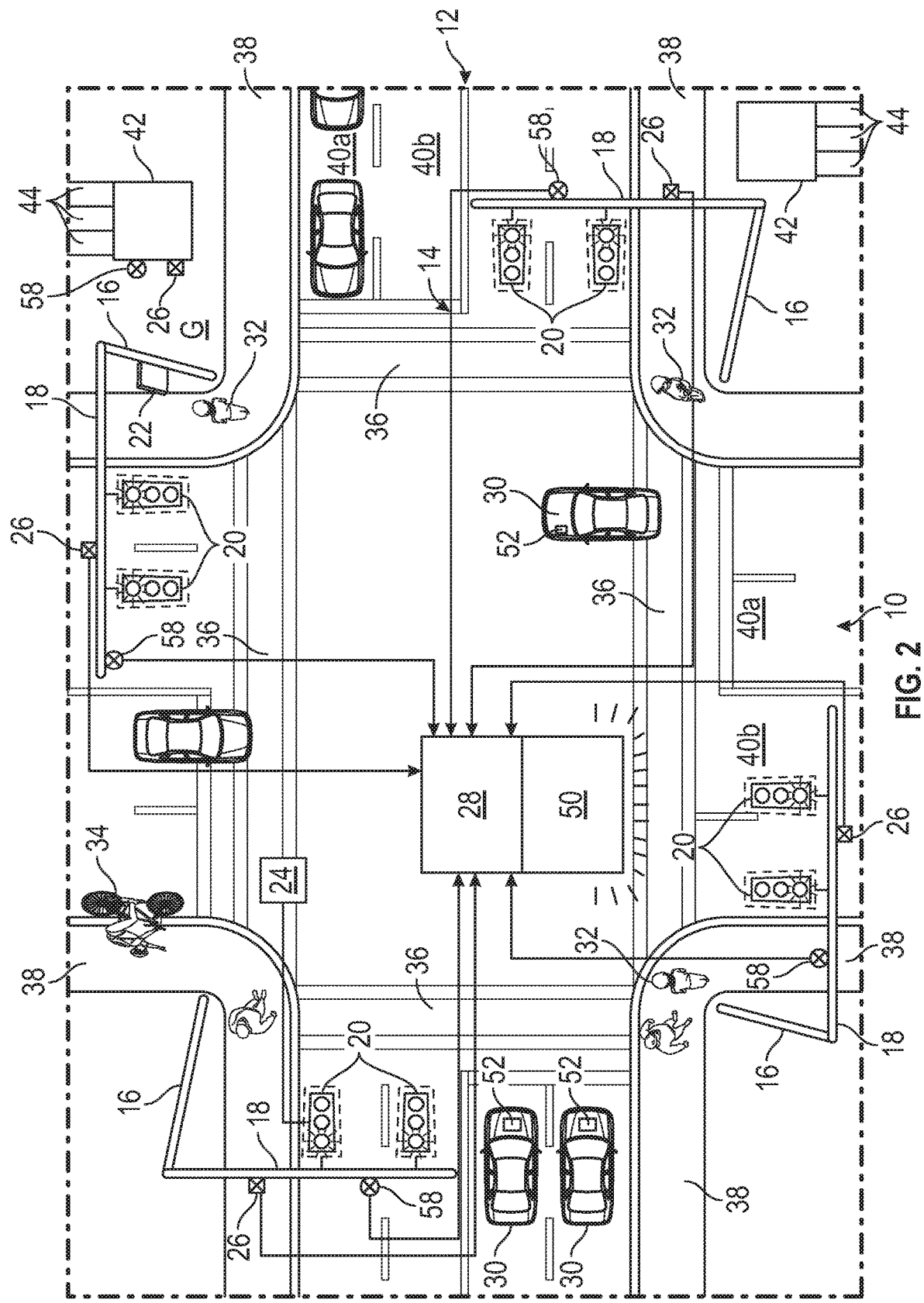
FIG. 2 is an overhead view of an intersection incorporating a system according to the invention.

Ambient or environmental sensors 26 are mounted to infrastructure, such as the pole 16 or arms 18 for example. A control system 28 uses data generated by the sensors 26 to track moving objects (vehicles 30, pedestrians 32, bikers 34, etc.) and to detect stationary objects, such as a location of a crosswalk 36, sidewalk 38, and/or a lane 40*a*, 40*b* for example, such that the control system 28 can determine the current object position of moving objects in relation to stationary objects. Thus, in addition to tracking and determining positions of moving objects, the sensors 26 are used to identify the location of fixed structures such as lanes 40*a*/40*b*, crosswalks 36, sidewalks 38, etc., as well as buildings 42, and parking spaces 44 (FIG. 2), such that moving objects (pedestrians 32, bikers 34, vehicles 30, etc.) can have a frame of reference. In one example, the control system 28 uses ambient/environmental sensors 26 that comprise one or more of the following: motion sensor, optical camera sensor, radar sensor, lidar sensor, laser sensor and/or ultrasonic sensor. The ambient sensors 26 capture fixed object locations as well as location and movement information from pedestrians 32 and vehicles 30 in relation to other vehicles 30, pedestrians 32, or infrastructure, e.g. traffic light system 14, building 42, etc., such that this information can be broadcast over a communication system 50 such as vehicle-to-X, for example.

The communication system 50 wirelessly communicates via the vehicle-to-X communication systems to exchange information with surrounding vehicles 30 or infrastructure devices. The vehicle-to-X messages sent by the vehicles 30 usually comprise at least an absolute position, an absolute speed, and a piece of information about the direction of travel of the vehicle 30. The vehicles 30 can include vehicle control systems 52 that communicate the vehicle data to the control system 28. The vehicle control systems 52 can also include GPS and communication systems. The vehicle-to-X messages sent/generated by the control system 28 usually comprise moving object location, lane location, crosswalk location, parking space locations, etc. For the vehicle-to-X communication system to send and/or receive messages and/or information, the system can use one or more of the following connection classes: WLAN connection, e.g. based on IEEE 802.11, ISM (Industrial, Scientific, Medical Band) connection, Bluetooth® connection, ZigBee connection, UWB (ultrawide band) connection, WiMax® (Worldwide Interoperability for Microwave Access) connection, LTE-V2X, Dedicated Short Range Communications (DSRC), infrared connection, mobile radio connection, and/or radar-based communication.

It is important that the data from the environmental sensors 26 be accurate, especially when autonomous vehicles are relying on the data. However, in some circumstances, the data from the sensors 26 can be adversely affected or compromised by movement of the pole 16 and/or traffic arms 18. For example, high winds can cause the pole and arms to wave, bend, and/or oscillate in multiple directions. To account for this movement, the control system 28 includes one or more movement sensors 58, such as accelerometers for example, that are mounted to the infrastructure, e.g. the pole 16 and/or arms 18, to monitor and track movement of the infrastructure. The control system 28 then uses the accelerometer data to correct deviations in detected object position. For example, the control system 28 determines an amount of movement of the infrastructure component, e.g. traffic pole 16, traffic arm 18, etc., based on data from the accelerometer and subsequently corrects any current moving object positions during the movement to compensate for movement of the infrastructure component to provide better overall accuracy.

The control system 28 can be a separate system or can be incorporated as part of the traffic light control system 24 for the traffic lights 20. The control system 28 can include one or more controllers comprising a processor, memory, and one or more input and/or output (I/O) device interface(s) that are communicatively coupled via a local interface. The local interface can include, for example but not limited to, one or more buses and/or other wired or wireless connections. The local interface may have additional elements, which are omitted for simplicity, such as controllers, buffers (caches), drivers, repeaters, and receivers to enable communications. Further, the local interface may include address, control, and/or data connections to enable appropriate communications among the aforementioned components.

The controller may be a hardware device for executing software, particularly software stored in memory. The controller can be a custom made or commercially available processor, a central processing unit (CPU), an auxiliary processor among several processors associated with the computing device, a semiconductor based microprocessor (in the form of a microchip or chip set), or generally any device for executing software instructions.

The memory can include any one or combination of volatile memory elements (e.g., random access memory (RAM, such as DRAM, SRAM, SDRAM, VRAM, etc.)) and/or nonvolatile memory elements (e.g., ROM, hard drive, tape, CD-ROM, etc.). Moreover, the memory may incorporate electronic, magnetic, optical, and/or other types of storage media. Note that the memory can also have a distributed architecture, where various components are situated remotely from one another, but can be accessed by the processor.

The software in the memory may include one or more separate programs, each of which includes an ordered listing of executable instructions for implementing logical functions. A system component embodied as software may also be construed as a source program, executable program (object code), script, or any other entity comprising a set of instructions to be performed. When constructed as a source program, the program is translated via a compiler, assembler, interpreter, or the like, which may or may not be included within the memory.

The Input/Output devices that may be coupled to system I/O Interface(s) may include input devices, for example but not limited to, a keyboard, mouse, scanner, microphone, camera, proximity device, etc. Further, the Input/Output devices may also include output devices, for example but not limited to, a printer, display, etc. Finally, the Input/Output devices may further include devices that communicate both as inputs and outputs, for instance but not limited to, a modulator/demodulator (modem; for accessing another device, system, or network), a radio frequency (RF) or other transceiver, a telephonic interface, a bridge, a router, etc.

The controller can be configured to execute software stored within the memory, to communicate data to and from the memory, and to generally control operations of the computing device pursuant to the software. Software in memory, in whole or in part, is read by the processor, perhaps buffered within the processor, and then executed.

As discussed above, the control system 28 uses the accelerometer data to correct deviations in detected object position that can occur when environmental sensors are mounted on infrastructure that is expected to be stationary but which can move due to environmental impacts. The movement sensors 58, e.g. accelerometers, and the environmental sensors 26 can be mounted anywhere along the infrastructure component, e.g. sign, pole, building, street light, and/or traffic light. In one example, the movement sensors 58 are mounted immediately adjacent to the environmental sensors 26 to provide for further increased accuracy. Optionally, the movement sensor 58 and the environmental sensor 26 can be packaged together as a single unit.

As discussed above, in one example the movement sensors 58 are accelerometers. An accelerometer is an electromechanical device used to measure acceleration forces. Two examples of accelerometers include an accelerometer that utilizes a piezoelectric effect and an accelerometer that comprises a capacitance sensor. The piezoelectric effect uses microscopic crystal structures that become stressed due to accelerative forces. These crystals create a voltage from the stress, and the accelerometer interprets the voltage to determine velocity and orientation. The capacitance accelerometer senses changes in capacitance between microstructures located next to the device. If an accelerative force moves one of these structures, the capacitance will change and the accelerometer will translate that capacitance to voltage for interpretation. These types of accelerometers are merely examples and it should be understood that any type of accelerometer can be used in combination with the environmental sensor 26.

It should also be understood that although a particular component arrangement is disclosed in the illustrated embodiment, other arrangements will benefit herefrom. Although particular step sequences are shown, described, and claimed, it should be understood that steps may be performed in any order, separated or combined unless otherwise indicated and will still benefit from the present invention.

Although the different examples have specific components shown in the illustrations, embodiments of this invention are not limited to those particular combinations. It is possible to use some of the components or features from one of the examples in combination with features or components from another one of the examples.

Although an example embodiment has been disclosed, a worker of ordinary skill in this art would recognize that certain modifications would come within the scope of the claims. For that reason, the following claims should be studied to determine their true scope and content.

The invention claimed is:

1. An infrastructure system comprising:
   a first sensor mounted to an infrastructure component, wherein the first sensor is configured to detect an object;
   a second sensor mounted to the infrastructure component, wherein the second sensor is configured to sense movement of the infrastructure component; and
   a processor configured to determine an object position of the object detected by the first sensor, determine an amount of correction for the object position based on movement detected by the second sensor, and determine a corrected object position of the object based on the object position and the amount of correction on for the object position.

2. The infrastructure system according to claim 1, wherein the second sensor comprises an accelerometer.

3. The infrastructure system according to claim 2, wherein the infrastructure component comprises a pole.

4. The infrastructure system according to claim 3, wherein the first sensor comprises a motion sensor, a radar sensor, an optical camera sensor, a lidar sensor, a laser sensor and/or an ultrasonic sensor.

5. The infrastructure system according to claim 1, wherein:
   the first sensor detects the object position of the object relative to a stationary object,
   and
   the second sensor comprises an accelerometer.

6. The infrastructure system according to claim 5, wherein the object comprises one or more of a vehicle, pedestrian, and/or biker,
   wherein the stationary object comprises one or more of a crosswalk, sidewalk, and/or a lane, and
   wherein the infrastructure component comprises a sign, pole, building, and/or street light.

7. The infrastructure system according to claim 6, wherein movement of the infrastructure component is initiated by a wind force.

8. The infrastructure system according to claim 7, wherein the processor is configured to:
   receive data from the first sensor and the second sensor,
   determine the movement of the infrastructure component based on the data from the second sensor, and
   correct the object position to compensate for the movement of the infrastructure component.

9. The infrastructure system according to claim 1, wherein movement of the infrastructure component is initiated by an external force exerted on the infrastructure component.

10. The infrastructure system according to claim 9, wherein the external force comprises a wind force.

11. The infrastructure system according to claim 1, wherein the processor is configured to:
    receive data from the first sensor and the second sensor,
    determine the movement of the infrastructure component based on the data from the second sensor, and
    correct the object position to compensate for the movement of the infrastructure component.

12. The infrastructure system according to claim 11, wherein the processor is configured to broadcast the corrected object position via a communication system.

13. The infrastructure system according to claim 12, wherein the communication system comprises a vehicle-to-everything communication system and includes one or more of the following interfaces: vehicle-to-infrastructure, vehicle-to-network, vehicle-to-vehicle, vehicle-to-pedestrian, vehicle-to-device, and/or vehicle-to-grid.

14. A method of an infrastructure system determining a position of an object, the method comprising:
    detecting an object using a first sensor mounted to an infrastructure component;
    sensing movement of the infrastructure component using a second sensor mounted to the infrastructure component;
    determining an object position of the object detected by the first sensor;
    determining an amount of correction for the object position based on movement detected by the second sensor; and
    determining a corrected object position of the object based on the object position and the amount of correction for the object position.

* * * * *